Jan. 23, 1962 G. A. BACKMAN ET AL 3,018,048
GATED ACCUMULATOR
Filed April 21, 1959 8 Sheets-Sheet 1

INVENTORS: G. A. BACKMAN
W. C. G. ORTEL

BY Lucien C. Canepa

ATTORNEY

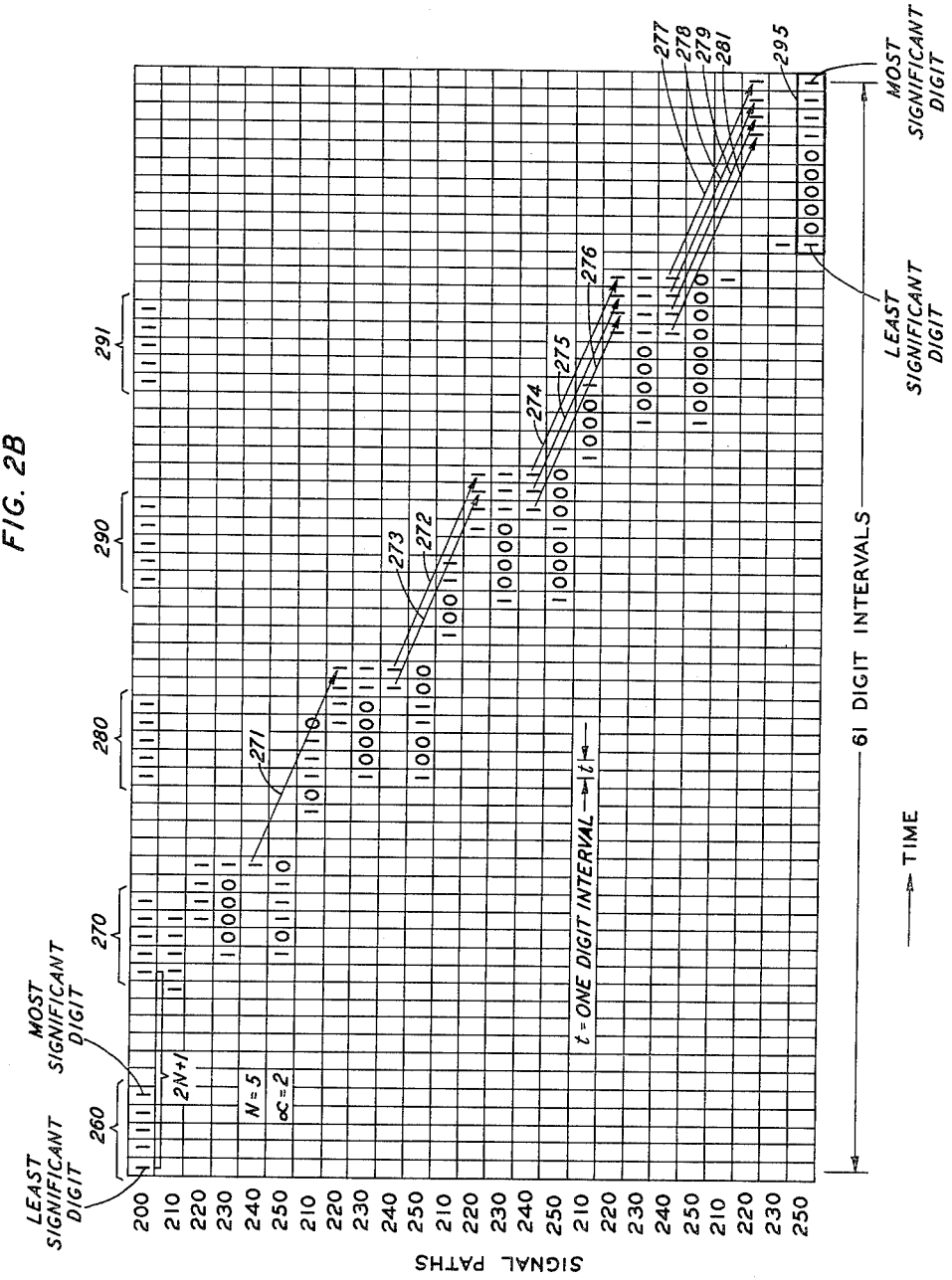

INVENTORS: G. A. BACKMAN
W. C. G. ORTEL
BY Lucian C. Canepa
ATTORNEY

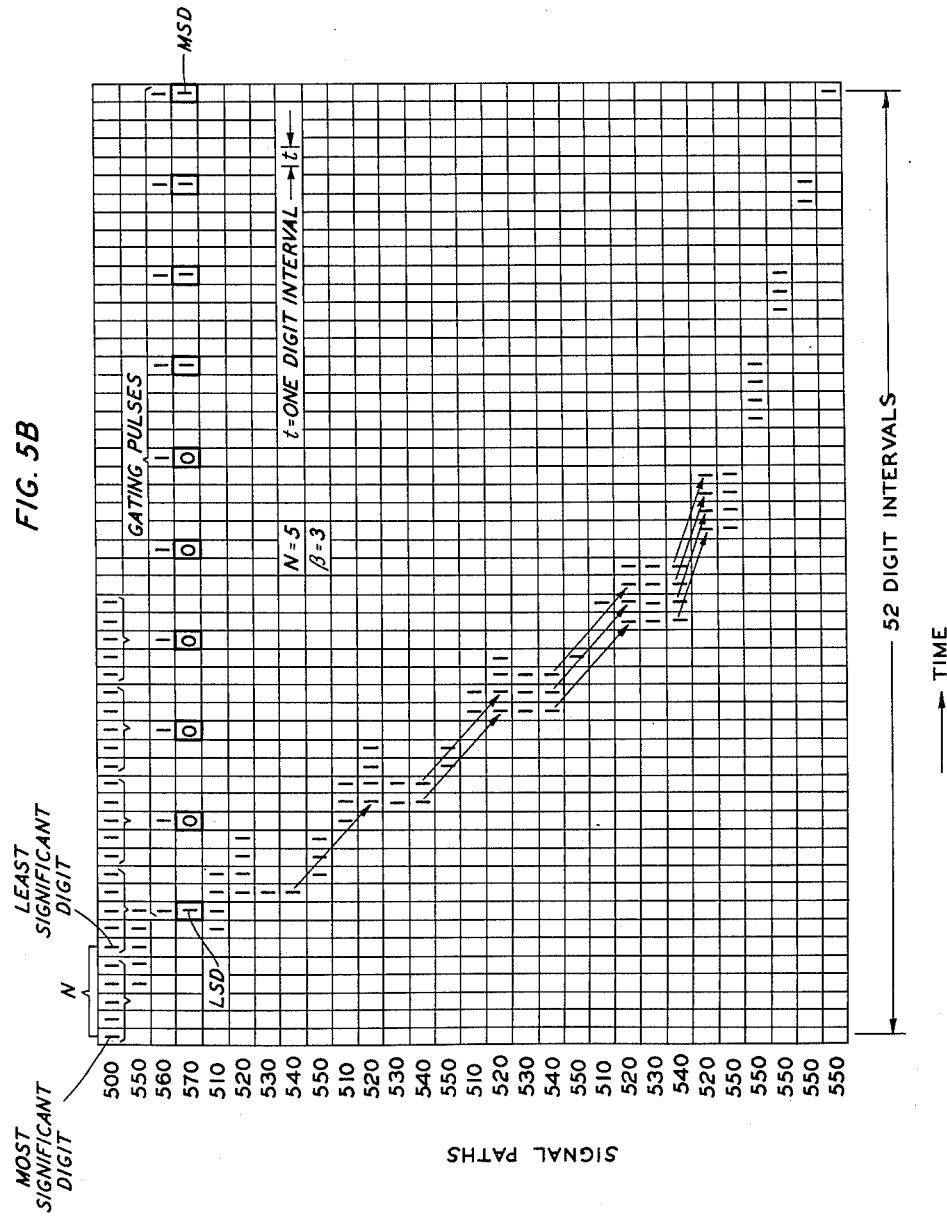

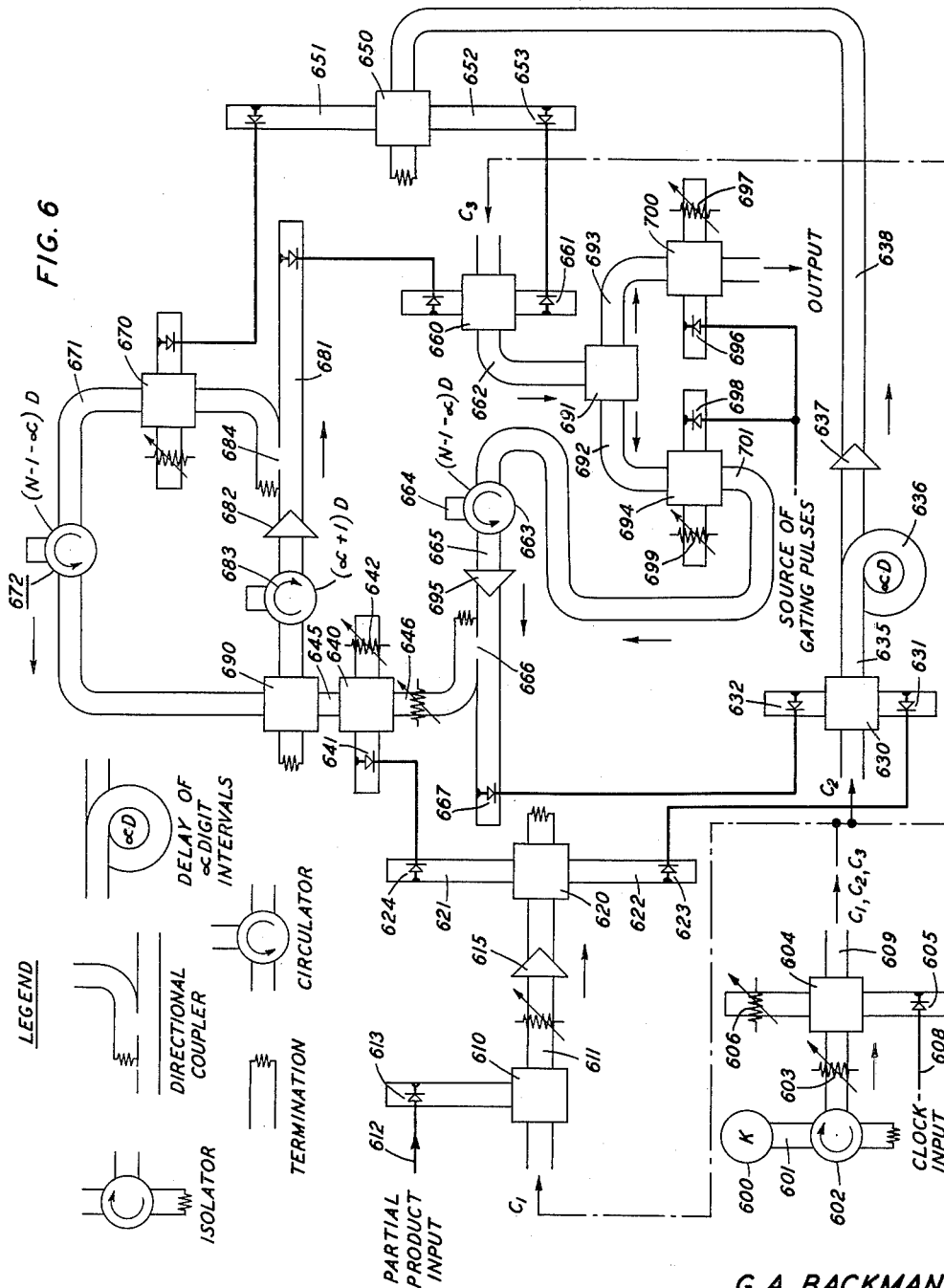

3,018,048
GATED ACCUMULATOR

Gustav A. Backman, Franklin Township, Somerset County, and William C. G. Ortel, Summit, N.J., assignors to Bell Telephone Laboratories, Incorporated, New York, N.Y., a corporation of New York
Filed Apr. 21, 1959, Ser. No. 807,852
2 Claims. (Cl. 235—176)

This invention relates to digital information processing circuits and more particularly to high speed gated accumulator circuits including microwave elements.

In information processing systems it has been customary to represent binary information by the presence or absence of direct current pulses in successive time positions. This type of representation is reliable at relatively low frequencies, and systems, such as computers, have been built in which digital pulse repetition rates of four million per second have been satisfactorily handled. At higher digital pulse repetition rates, however, it is exceedingly difficult, using the customary techniques of the prior art, to build a reliable computer. This difficulty is caused in part by the lack of a pulse amplifier having sufficient bandwidth to amplify direct current pulses at these repetition rates, and, also, by the relatively slow speed of other conventional computer components.

A new approach for handling digital information at pulse repetition rates of about one hundred million per second is embodied in the circuits disclosed in W. M. Goodall Patent 2,914,249, issued November 24, 1959. The embodiments there disclosed are considered to represent a major breakthrough in the field of digital information processing circuits. In the noted Goodall patent, a series of binary digits are represented by a train in which each pulse is a burst of electromagnetic wave energy having a carrier frequency of from five to twelve kilomegacycles. Energy in this frequency range can be effectively amplified by distributed amplifiers, such as traveling wave tubes. Furthermore, microwave elements such as waveguide hybrid junctions are well suited for performing various switching functions in logic circuits handling bursts of high frequency electromagnetic wave energy at repetition rates of about one hundred million per second.

The desire to handle a maximum amount of information in a minimum amount of time has led to the development of microwave logic systems using increasingly high repetition rates. As, however, the pulse or burst repetition rates of logic circuits including microwave elements have been increased to values considerably above one hundred million per second, it has been found that the inherent delays of some of the microwave elements, for example, the traveling wave tubes, begin to approach a pulse interval or digit period. By a pulse interval is meant the elapsed time between corresponding points of successive positions or time slots, in which positions pulses of electromagnetic energy may or may not appear.

At a point at which the inherent delay of a microwave logic circuit element exceeds a pulse interval in time magnitude, it, of course, becomes impossible in a logic path including such an element to delay a pulse for only one pulse interval, thereby to make it available in an immediately next successive time slot.

Such availability is essential, for example, in a prior art accumulator circuit in which the algorithm of addition is performed. More specifically, in a circuit designed to add the binary words "011" and "001," whose decimal equivalents are, respectively, three and one, addition of the least significant digits (i.e., for the specific case here, the right-hand or first one of each of the words) gives in the first time slot a partial sum of "0" and a first carry of "1," which first carry of "1" should be available in the second or next more significant time slot to be added to "1" and "0," thereby to produce another "0" and a second carry "1," which second carry of "1" should then be available in the next successive or third time slot to be added a "0" and "0" to give a final sum of 100, whose decimal equivalent, of course, is four.

Thus, in certain high speed microwave logic circuits it appeared that the inherent time delays of the elements thereof would limit the repetition rates, and, thus, the speed, at which information could be processed thereby. This limitation is, however, largely removed by the novel microwave accumulators described in a copending application of D. W. Hagelbarger, Serial No. 798,773, filed on March 11, 1959, in which the information-handling speeds of microwave accumulators are not directly limited by the inherent delays possessed by the elements thereof.

Either the Hagelbarger accumulator or the gated accumulator described herein may advantageously be included as a component part of a multiplier system. Such a system may, for example, include a partial product generator which serially produces, in response to each multiplier pulse applied thereto, the digits of the multiplicand.

One specific feature of the Hagelbarger invention is the improvement of an accumulator circuit having inherent interstage delays comparable in magnitude with, or greater than, the digit interval corresponding to a high pulse repetition rate, by selectively adding interstage delays thereto such that signals that are not retrievable in time to be inserted in their usual time positions are selectively delayed until a later time, whereby the circuit may then be operated at higher-than-normal pulse repetition rates, thereby to be capable of processing information at extremely high speeds.

An object of the present invention is an improved microwave accumulator circuit.

Another object of this invention is to decrease the time required to obtain an answer from a microwave accumulator.

More specifically, an object of this invention is to decrease the time required to obtain an answer from a microwave accumulator circuit of the type disclosed in the aforementioned Hagelbarger application by providing a novel output gating arrangement therefor.

These and other objects of the present invention are realized in an embodiment thereof which comprises traveling wave tubes and waveguide hybrid junctions including asymmetrically conducting devices or rectifiers, the junctions functioning as AND, EXCLUSIVE-OR and INHIBIT circuits, and the junctions and traveling wave tubes being interconnected by sections of waveguide. The embodiment is arranged to function as a high speed gated accumulator which is capable of processing serially presented partial products at a pulse repetition rate of one hundred and sixty million per second and higher.

One specific high speed gated accumulator illustratively embodying the principles of this invention includes first and second microwave logic stages each of which includes an AND circuit and an EXCLUSIVE-OR circuit and between which stages there are connected intermediate sum, first carry, second carry, and output paths. Each of these, except the second carry path, includes a traveling wave tube which introduces a delay greater than a pulse interval. The proper timing of carries in an arrangement of this type is maintained by selectively adding a delay to each of the four paths, in accordance with the principles of Hagelbarger's invention. Coupled to the output path of such a configuration, in accordance with the principles of this invention, is a stage which includes an INHIBIT circuit, an AND circuit, and a source of gating pulses, the source supplying properly timed pulses to the INHIBIT and AND circuits, whereby the digits of the product serially appear, with a pulse interval equal to that of the multiplier, at the output of the AND circuit.

The multiplier pulse interval in a multiplier system including a gated accumulator made in accordance with the principles of the present invention may be less than that of a Hagelbarger-type accumulator. As a result, a Hagelbarger accumulator in combination with an output gating arrangement of the type described herein is capable of performing a given multiplication problem, at a given pulse repetition rate, in a time less than that required by the accumulator alone.

One feature of the present invention is an accumulator comprising first and second microwave logic stages between which are connected intermediate sum, first carry, second carry, and output paths, each of which, except the second carry path, includes a microwave component which introduces a delay greater than a pulse interval, the output path including circuitry for gating the final product digits out of the accumulator at a repetition rate equal to that of the multiplier digits.

Another feature of this invention is output gating circuitry for a microwave accumulator of the type which is capable of processing digital words that are spaced apart by a first interval and the digital bits of which are spaced apart by a second interval, the second interval being sufficiently small that the inherent interstage delays of the accumulator make it impossible to retrieve carry signals within one digit interval of their generation, the output gating circuitry including a circuit for generating gating pulses whose pulse spacing is equal to the first interval.

A further feature of the present invention is output gating circuitry for a high speed microwave accumulator, the circuitry including an INHIBIT circuit having an inhibiting input terminal, a normal input terminal and an output terminal; an AND circuit having two input terminals and an output terminal; a source of gating pulses connected to the inhibiting input terminal and to one of the input terminals of the AND circuit, whereby the application of accumulated digital information to the normal input terminal and to the other of the input terminals of the AND circuit results in the appearance at the output terminal of the AND circuit of digits of the answer, the digits occurring in synchronism with the gating pulses.

Thus, in microwave circuits embodying the principles of the present invention, information may be processed in a time less than that heretofore considered possible.

A complete understanding of the present invention and of the above and other features thereof may be gained from a consideration of the following detailed description and the accompanying drawing, in which:

FIG. 2B is a timing diagram illustrating the mode of operation of the accumulator of FIG. 2A;

FIG. 5B is a timing diagram illustrating the mode of operation of the novel gated accumulator of FIG. 5A; and FIG. 6 depicts an illustrative microwave implementation of the block diagram of FIG. 3A.

Figure 1:
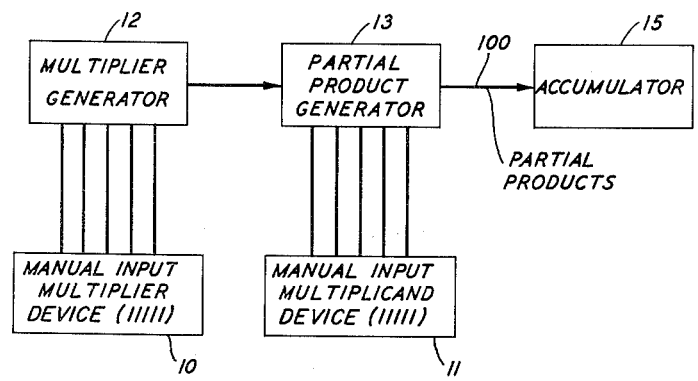
FIG. 1 is a block diagram of a digital multiplier including an accumulator.

Referring to FIG. 1, there is shown a system capable of multiplying two binary words. The system includes a manual input multiplier device 10, a manual input multiplicand device 11, a multiplier generator 12, and a partial product generator 13. These circuits cooperate to form serially-presented partial products, which are coupled by means of a path 100 to an accumulator 15.

The circuits included in the blocks 10, 11, 12, and 13 may easily be implemented by a worker skilled in the art of pulse-forming techniques. One exemplary implementation includes manual switches in each of the blocks 10 and 11, by means of which multiplicand and multiplier digital information is fed into the system. Then, for example, binary signals representing the multiplier are coupled in parallel to the multiplier generator 12, where they are converted to serial form. These signals are coupled to the partial product generator 13, to which are fed in parallel binary signals representing the multiplicand. The generator 13 is arranged such that it serially produces, in response to each multiplier 1 pulse applied thereto, the digits of the multiplicand. These digits or partial products are, in turn, coupled to the block 15, whereby the process of accumulation an answer or product is formed.

Illustratively, the multiplier generator 12 and the partial product generator 13 of FIG. 1 may each be of the form of the parallel-to-serial converter shown in FIG. 13–2b on page 268 of "High-Speed Computing Devices," by the staff of Engineering Research Associates, Inc., McGraw-Hill, 1950.

Emphasis hereinafter will only be directed to the accumulator 15 of the multiplier shown in FIG. 1, for this invention is neither limited by nor dependent on any particular means for forming pulses representing partial products. Indeed, any circuits capable of supplying properly-spaced serially-presented partial products in binary form, characterized by a pulse repetition rate of about one hundred and sixty million per second, may be combined with a gated accumulator illustratively embodying the principles of this invention, thereby to form a system capable of performing multiplication at very high speeds.

Figure 2A:
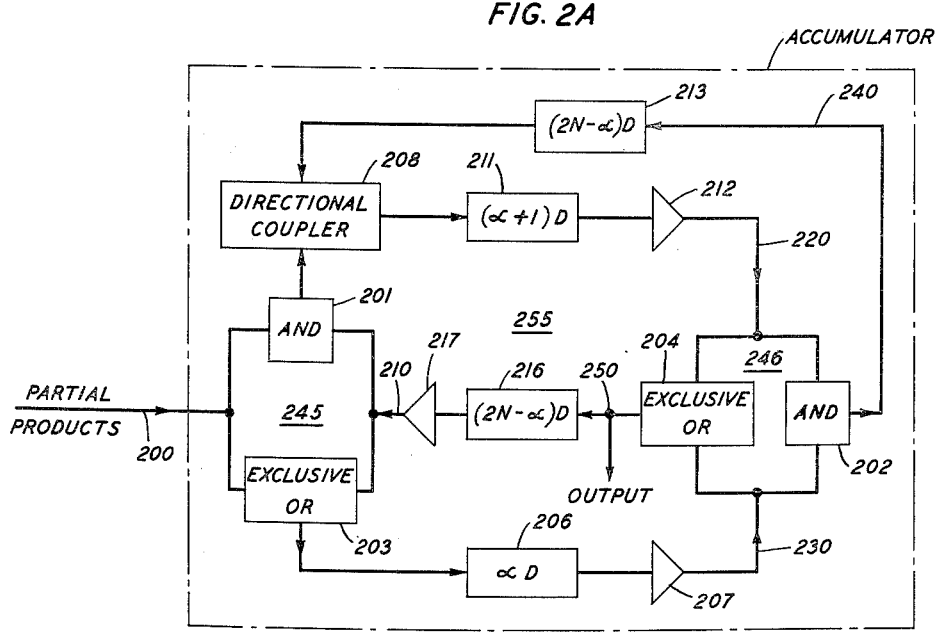
FIG. 2A is a block diagram of a serial microwave accumulator made in accordance with the principles disclosed in the aforementioned Hagelbarger application.
Figure 3A:
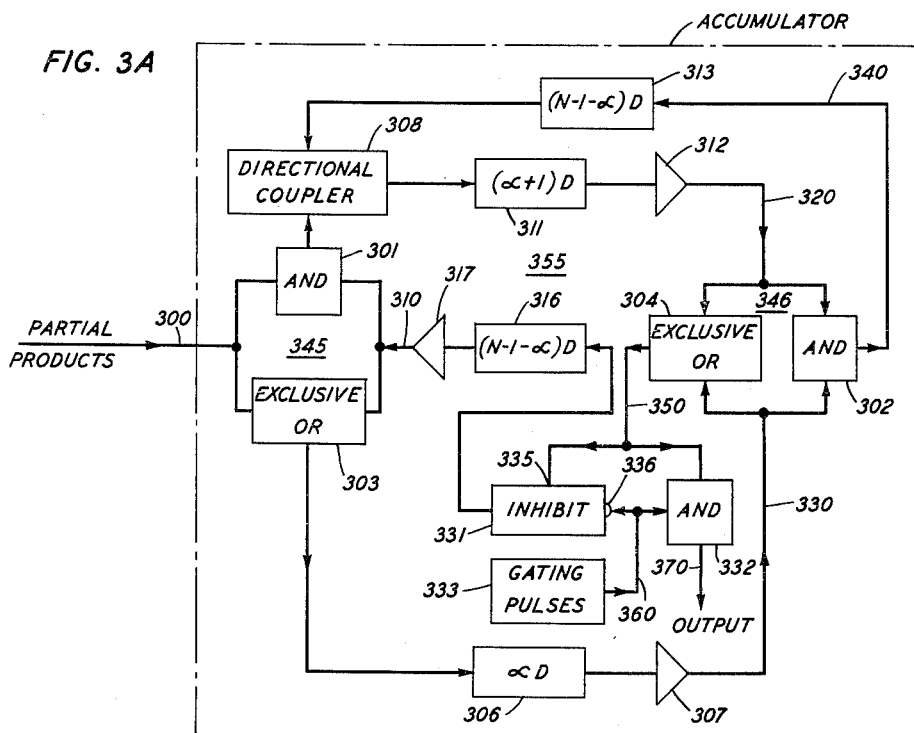
FIG. 3A is a block diagram of a serial microwave accumulator of the type shown in FIG. 2A to which has been added output gating circuitry, thereby to form a gated accumulator made in accordance with the principles of the present invention.
Figure 4A:
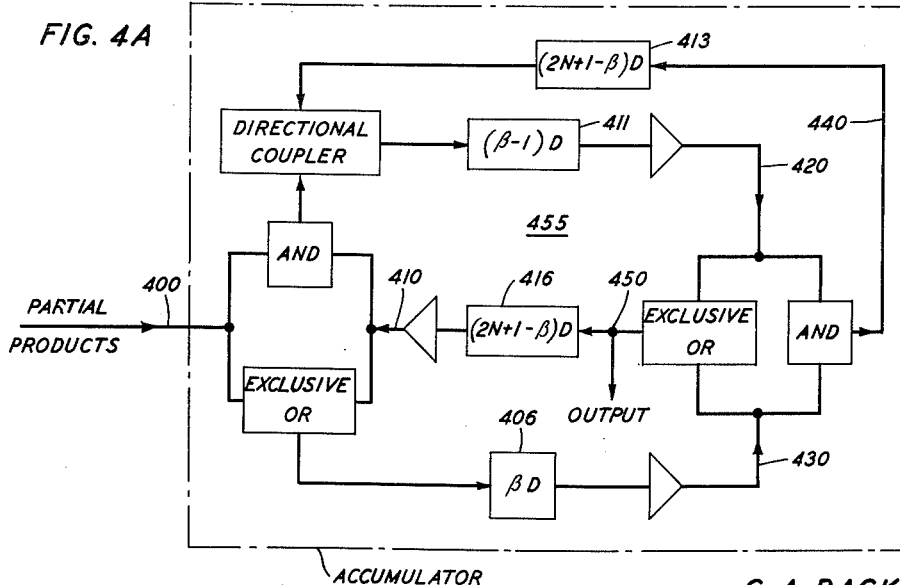
FIG. 4A is a block diagram of another serial microwave accumulator embodying the principles of the Hagelbarger invention.
Figure 5A:
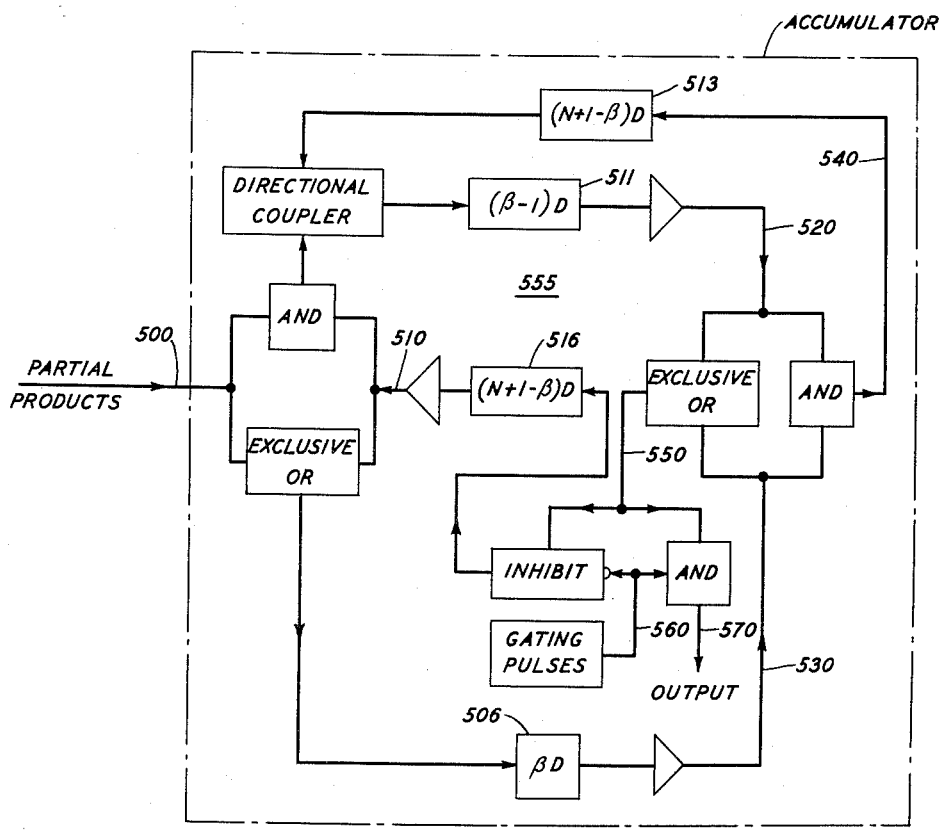
FIG. 5A is a block diagram of a serial microwave accumulator of the type shown in FIG. 4A to which has been added output gating circuitry, thereby to form a gated accumulator made in accordance with the principles of the present invention.

In the interests of simplicity and clarity of presentation, the specific descriptions herein of both the Hagelbarger-type of accumulator, shown in FIGS. 2A and 4A, and of the gated accumulators illustratively embodying the principles of this invention, shown in FIGS. 3A, 5A, and 6, will relate to the mode of operation of an accumulator to which are coupled partial products, corresponding to a multiplier and a multiplicand each having the binary form "11111." This is indicated in each of the blocks 10 and 11 of FIG. 1 by the word "11111" which appears in parentheses therein. The correct product in binary form of these words, each of which is representative of the decimal number 31, is "1111000001" which is equivalent to the decimal number 961.

The accumulators shown in block diagram form in FIGS. 2A, 3A, 4A, and 5A will be described with the aid, respectively, of the timing diagrams of FIGS. 2B, 3B, 4B, and 5B, and then the specific illustrative gated accumulator shown in FIG. 6 will be described.

The basic circuits or blocks out of which the accumulators described herein are built include the AND unit, which produces an output signal only when all of the input paths thereto are energized; the EXCLUSIVE-OR unit, which produces an output signal if one but not both of its input paths is energized; the INHIBIT unit, to which extends an inhibiting signal lead (schematically distinguished by a small button connecting the lead to the box representing the unit) and a normal signal lead, a signal on the normal lead passing to an output of the unit unless a signal simultaneously appears on the inhibiting lead, in which case the unit produces no output; and delay units having delays equal to various numbers of digit periods. Delay units are depicted in the drawing by logic blocks having therein the letter "D" preceded by a number indicating the number of digit periods of delay provided by the delay unit and the other components serially-connected therewith. In other words, it will be assumed for our purposes here that all of the delay of a signal path is lumped in one delay unit, although each delay block in fact introduces only enough delay to make the total of its delay and that of the other components of the signal path in which it is placed equal to a predetermined value.

Also, each of the accumulators described herein includes one or more directional couplers having, for example, three terminals, characterized in that a transfer of energy without reflection may take place from the first to the third terminal thereof, but no transfer of energy can take place from the first to the second terminal. Similarly, energy may be transferred from the second to the third terminal without reflection, but not so from the second to the first terminal.

Turning now to FIG. 2A, there is depicted a microwave accumulator 255 made in accordance with the principles disclosed in the aforementioned Hagelbarger application. The accumulator 255 is designed for operation at pulse repetition rates whose pulse intervals are less than the inherent delays possessed by some of the microwave components thereof. The proper timing of carries in an arrangement of this type is maintained by selectively adding delays to the signal paths thereof. The added delays make it impossible to have second carry signals available for use in the same accumulator cycle in which they are generated. Accordingly, the delays are arranged such that a second carry is selectively delayed for insertion into a proper time position in the next immediately following accumulator cycle. To obtain an output or answer in an accumulator embodying this novel concept requires more pulse intervals than is required in a conventional accumulator whose pulse repetition rate is directly limited by the inherent delays in the circuit. However, an accumulator embodying the principles of the Hagelbarger invention may be operated at pulse repetition rates corresponding to pulse intervals which are considerably less than the inherent delays of the circuit. Therefore, the true or total time involved in obtaining an answer is less.

The accumulator 255 shown in FIG. 2A includes a path 200 to which are coupled partial products, a first stage 245 including an AND circuit 201 and an EXCLUSIVE-OR circuit 203, a second stage 246 including an AND circuit 202 and an EXCLUSIVE-OR circuit 204, an intermediate sum path 230 including a delay unit 206 and an amplifier 207, a directional coupler 208, a first carry path 220 including a delay unit 211 and an amplifier 212, a second carry path 240 including a delay unit 213, a final sum path 250 from which an output signal may be abstracted, and a delay unit 216 and an amplifier 217 serially-connected between the path 250 and a path 210 that extends to an input of the stage 245.

Appearing on the signal path 200 of the accumulator 255 of FIG. 2A are digital signals representing partial products. The partial product spacing for which the accumulator of FIG. 2A is designed is $2N+1$ digit periods, where N is the number of digits per partial product. N equals 5 in the specific examples to be considered herein.

Each of the delay blocks 206, 211, 213, and 216 of FIG. 2A includes therein the letter $\alpha$ which for the discussion herein of FIGS. 2A and 3A will be given the value 2.

Referring to FIG. 2B there is depicted in diagrammatic form the presence or absence of pulses on selected ones of the signal paths of the accumulator of FIG. 2A. The presence of a pulse in a given time slot or position is represented by the digit "1" therein and the absence of a pulse in a given time slot is represented by a "0" or no mark at all in that slot.

If a pulse does in fact appear in a given time slot or position, the pulse may, illustratively, be considered to occur exactly in the center of the time slot, the width of the pulse being typically about one-half the width of a time slot.

FIG. 2B indicates the manner in which partial products 260, 270, 280, 290, and 291, which are serially-presented, least significant digit first, on the path 200 of FIG. 2A with a spacing of $2N+1$, are combined in the accumulator of FIG. 2A.

Note that the partial product spacing $2N+1$ is depicted in FIG. 2B as extending from midpoint-to-midpoint of the first time positions of two adjacent partial products. This same midpoint-to-midpoint mode of depiction is also employed in each of FIGS. 3B, 4B, and 5B.

The arrows 271 through 279 and 281 of FIG. 2B indicate that second carry signals generated by the stage 246 of FIG. 2A are delayed by the units 213 and 211 so as to be reinserted into the stage 246 during an accumulator cycle next following the one in which they are generated. An accumulator cycle is hereby defined as a time period which is one digit interval less than the partial product spacing. Thus, for example, in the diagram of FIG. 2B, wherein the partial product spacing is $2N+1$, an accumulator cycle extends over $2N$ digit intervals.

The accumulator of FIG. 2A produces on the final sum or output path 250 thereof an answer or product 295 (FIG. 2B) within sixty-one digit intervals. It will be shown below in connection with the description of FIGS. 3A and 3B that an accumulator of the type shown in FIG. 2A to which has been added output gating circuitry, thereby to form a gated accumulator made in accordance with the principles of the present invention, is capable of furnishing a final answer in a time less than sixty-one digit intervals.

A careful study of the timing diagram of FIG. 2B reveals that the arrangement of the information therein prior to the formation of the final product is unlike that found in a conventional accumulator. This dissimilarity of arrangement or form stems from the unavailability in a Hagelbarger accumulator of a carry signal in a time position immediately next following the one in which it is generated. More significantly, however, such a study indicates that in a Hagelbarger-type accumulator the digital components of the final answer are not characterized by a periodicity of occurrence. Accordingly, the possibility of successfully applying output gating techniques to such an arrangement appeared initially to be extremely doubtful. Nevertheless, we have developed an understanding of certain unobvious characteristics of the operation of a Hagelbarger-type accumulator and in accordance with that understanding we have invented arrangements by means of which information might be gated out of such an accumulator in a periodic manner, thereby to provide gated accumulators capable of processing a given amount of information in a time less than that required with Hagelbarger-type accumulators.

FIG. 3A depicts a specific illustrative gated accumulator 355 made in accordance with the principles of this invention. The accumulator 355 comprises a first stage 345 which includes an AND circuit 301 and an EXCLUSIVE-OR circuit 303, to one input of which stage there are coupled by means of a path 300 partial products whose corresponding digits occur N digit intervals apart.

The accumulator 355 also includes a second stage 346 comprising an AND circuit 302 and an EXCLUSIVE-OR circuit 304, a directional coupler 308, an intermediate sum path 330 including a delay unit 306 and an amplifier 307, a first carry path 320 including a delay unit 311 and an amplifier 312, a second carry path 340 including a delay unit 313, and a final product path interconnecting the stages 345 and 346.

The final product path of the accumulator 355 of FIG. 3A extends from the output of the EXCLUSIVE-OR circuit 304 by means of path 350 to the normal input terminal 335 of an INHIBIT unit 331 and also to one of the two inputs of an AND unit 332. The inhibiting input terminal 336 of the unit 331 is connected to the output of a source of gating pulses 333, which gating output is also connected to the other input of the AND unit 332. Connected to the output of the AND unit 332 is an output path 370 on which serially appear at regular intervals, in synchronism with the output of the source 333, the digits of the final product.

The output of the INHIBIT unit 331 is connected through a delay unit 316 and an amplifier 317 to a signal path 310 which extends to an input of the stage 345.

Figure 3B:
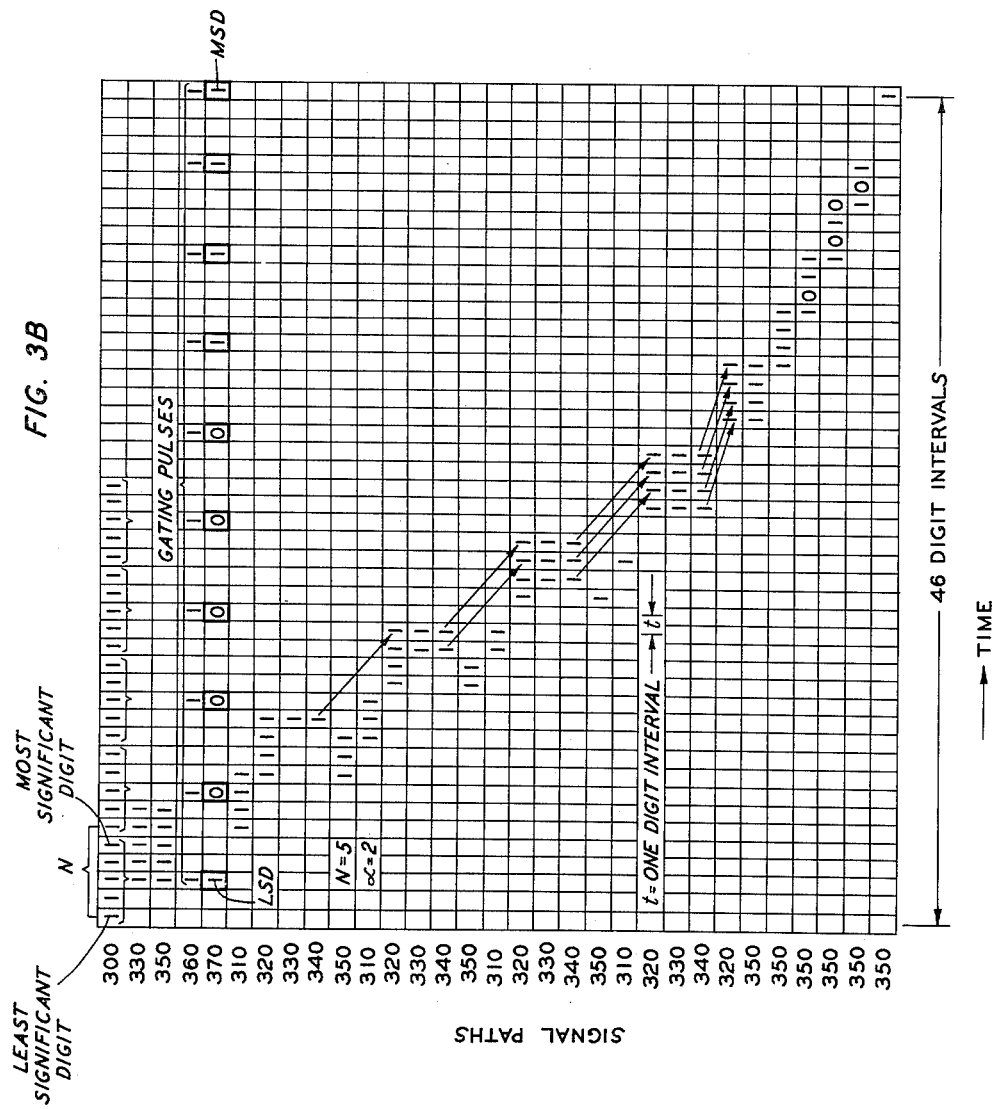
FIG. 3B is a timing diagram illustrating the mode of operation of the novel gated accumulator of FIG. 3A.

Referring now to FIG. 3B, there is illustrated the mode of operation of the novel gated accumulator of FIG. 3A for the case of $\alpha$ equal to 2; it is to be understood, however, that $\alpha$ may be any integer above one and less than $N-2$. Note in particular that the first gating pulse appears on the path 360 $\alpha$ digit intervals after the first appearance of a partial product digit on the path 300, and that the gating pulse interval is N digit periods.

The application of a gating pulse to the AND unit 332 in a given time position produces on the output path 370 thereof the digital information which appears on the path 350 in that time position. At the same time that information is blocked, by the application of a gating pulse to the inhibiting input of the unit 331, from being coupled to the delay unit 316.

Directly below the representation in FIG. 3B of each of the gating pulses there is shown a boxed-in digit representing a bit of the final product. The last or most significant digit of the final product occurs in digit position 47, so that the total time required to obtain the full product is forty-six digit intervals, as contrasted with sixty-one digit intervals for the ungated accumulator shown in FIG. 2A.

It is noted that the ungated accumulator shown in FIG. 2A and the gated accumulator shown in FIG. 3A each embodies a delayed carry arrangement. The meaning of this is illustrated by the following: the simultaneous occurrence of a pulse on each of the signal paths 200 and 210 of FIG. 2A results in the circuit 203 coupling a "0" to the intermediate sum path 230 and in the circuit 201 coupling a "1" to the carry path 220. Comparing the delay introduced by the unit 211 of FIG. 2A with that introduced by the unit 206, it is seen that the carry signal arrives at the stage 246 subsequent to the arrival there of the intermediate sum signal.

On the other hand both the ungated accumulator 455 shown in FIG. 4A and the gated modification thereof 555 shown in FIG. 5A embody an advanced carry arrangement.

The ungated accumulator 455 of FIG. 4A is similar to the ungated configuration shown in FIG. 2A, the only differences therebetween being (1) that the interval of the partial products coupled to the accumulator 445 is 2N, rather than 2N+1 for the arrangement of FIG. 2A, and (2) that the delay units 206, 211, 213, and 216 of FIG. 2A have been replaced by units designated 406, 411, 413, and 416, whose delays are, respectively, $\beta$, $\beta-1$, $2N+1-\beta$, and $2N+1-\beta$ digit intervals. $\beta$ will be given the value 3 for the specific examples to be considered herein. It is noted, however, that in FIG. 4A the symbol $\beta$ represents any integer less than 2N and greater than 2.

Figure 4B:
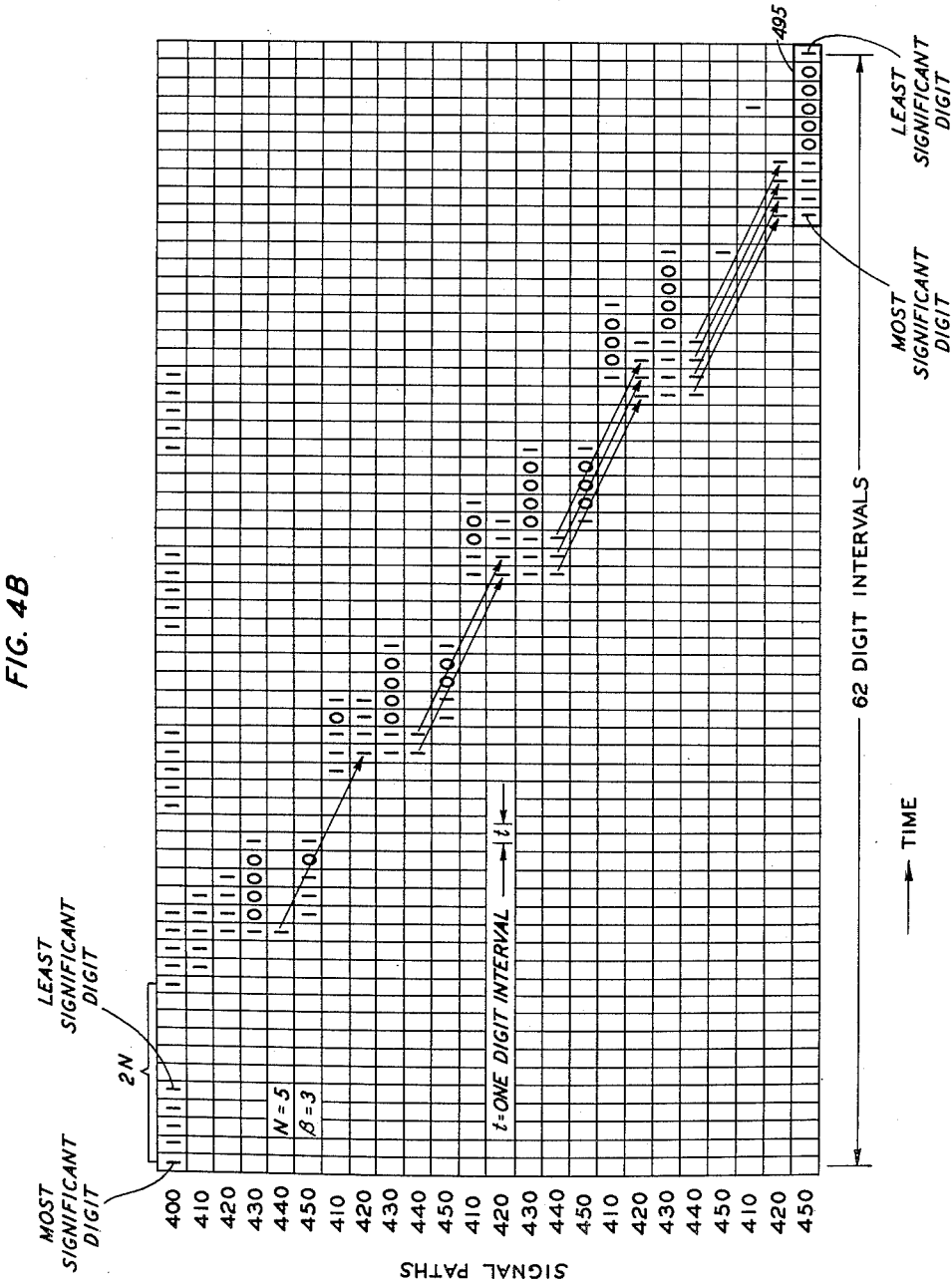
FIG. 4B is a timing diagram illustrating the mode of operation of the accumulator of FIG. 4A.

The mode of operation of the accumulator 445 of FIG. 4A is definitely illustrated by the timing diagram of FIG. 4B, from which it is seen that the accumulator 445 provides on the output path 450 thereof a final answer or product 495 within sixty-two digit intervals.

The gated accumulator 555 depicted in FIG. 5A embodies, as noted above, an advanced carry arrangement and is another illustrative embodiment of the principles of the present invention. The accumulator 555 is similar to the accumulator shown in FIG. 3A. Both are designed to receive partial products whose interval is N digits. The differences therebetween are (1) that the delay units 306, 311, 313, and 316 of FIG. 3A have been replied by units designated 506, 511, 513, and 516, whose delays are respectively $\beta$, $\beta-1$, $N+1-\beta$, and $N+1-\beta$ digit intervals and (2) the first gating pulse in the accumulator 555 appears on the path 560 $N+\beta-1$ digit intervals after the first appearance of a partial product digit on the path 500. The gating pulse interval for both accumulators is N digit intervals.

Included in each of the delay units 506, 511, 513, and 516 of the gated accumulator shown in FIG. 5A is the symbol $\beta$, which represents any integer less than N and greater than 2. Illustratively, $\beta$ equals 3 herein.

The mode of operation of the accumulator 555 of FIG. 5A is illustrated by the timing diagram of FIG. 5B, from which it is seen that the accumulator 555 provides on the output path 570 thereof a final answer or product within fifty-two digit intervals, as contrasted with sixty-two intervals for the ungated arrangement of FIG. 4A.

Referring to FIG. 6, there is shown a specific illustrative microwave implementation of the accumulator shown in block diagram form in FIG. 3A. The microwave components out of which the illustrative implementation is constructed are well known to workers in the microwave field. Also, it is noted that the aforementioned Goodall patent describes such components.

The microwave configuration includes a klystron oscillator 600 whose output is coupled by a waveguide section 601 to an isolator element 602. The output of the isolator 602 is coupled through a variable microwave attenuator element 603 to the input arm of a waveguide hybrid junction 604, in a side arm of which an asymmetrically conducting device 605, such as a crystal rectifier, is positioned. In the order side arm of the hybrid junction 604, there is located a variable microwave attenuator element 606 by means of which the impedances of the two side arms may be made equal in the absence of CLOCK INPUT pulses on lead 608. Under such conditions microwave energy applied to the input arm of the hybrid junction 604 does not appear on the output arm 609 thereof. If, however, the impedance state of the device 605 is changed from that of the element 606 by, for example, the application to the device 605 of CLOCK INPUT biasing pulses at a repetition rate of one hundred and sixty million per second, a portion of the energy coupled to the input of the hybrid junction 604 will appear on the output arm 609 at a burst repetition rate of one hundred and sixty million per second, and will be applied to the circuit points marked $C_1$, $C_2$, and $C_3$ by sections of connecting waveguide (not shown).

If the impedance which is required to balance a hybrid junction of the type described herein should include a reactive component, then a side arm combination comprising an attenuator element and a short circuiting plunger would be necessary, as is well known to workers in the art.

Another waveguide hybrid junction 610 operates in essentially the same manner as the junction 604, thereby to provide a microwave output on an arm 611 whenever a PARTIAL PRODUCT INPUT pulse is applied on lead 612 to a rectifier device 613. Thus, for each pulse applied to the device 613, a burst of microwave energy appears at the output of the junction 610.

The output of the junction 610 of the configuration of FIG. 6 is amplified by the element 615, which may, for example, be a traveling wave tube. The amplified output is then coupled to another hybrid junction 620, each of whose side arms 621 and 622 contains a rectifier device. These devices 623 and 624 serve, respectively, as biasing sources for the rectifier devices 631 and 641 of hybrid junctions 630 and 640.

The coupling of a burst of microwave energy corresponding to a partial product signal to the junction 620 results in the application of a portion of that energy to each of the devices 623 and 624, which devices then respectively unbalance the impedance match established in the junction 630 between the device 631 and another side arm rectifier device 632, and in the junction 640 between the device 641 and an attenuator element 642. Thus, a portion of the microwave signal $C_2$ applied to the junction 630 appears on the output arm 635, is transmitted through a looped section of waveguide 636, which is selected to introduce a delay of $\alpha$ digit intervals, passes through an amplifier 637, is coupled by a waveguide path 638 (which corresponds to the intermediate sum path 330 of FIG. 3A) to the input arm of a junction 650, and then splits equally to the side arms 651 and 652 thereof. In this manner, a rectifier 653 in the side arm 652 of the junction 650 applies an unbalancing bias to a rectifier 661 of another junction 660, thereby to enable a portion of the microwave signal $C_3$ to appear on the output arm 662 of the junction 660. The energy appearing on the output arm 662 of the junction 660 is transmitted to a waveguide T element 691 and then coupled to the side arms 692 and 693 thereof. The side arms 692 and 693 are connected, respectively, by sections of waveguide to the input arms of hybrid junctions 694 and 700. The side arms of the junction 700 contain, respectively, a rectifier device 696 and an attenuator 697, and the side arms of the junction 694 contain, respectively, a rectifier device 698 and an attenuator element 699. Each of the devices 696 and 698 is connected to a source of gating pulses.

The device 696 and the element 697 of the junction 700 are adjusted such that in the absence of gating pulses to the device 696 no microwave energy appears on the output waveguide arm of the junction 700. However, when a gating pulse biases the device 696 to an other-than-normal condition, the junction is unbalanced and input energy applied thereto appears on the output arm thereof. Thus, it is seen that the junction 700 and its associated components are the microwave implementation of the AND unit 332 of FIG. 3A.

On the other hand, the device 698 and the element 699 associated with the junction 694 are adjusted such that in the absence of gating pulses to the device 698 the junction 694 is unbalanced and a portion of the input energy applied thereto appears on the output arm 701 thereof. When, however, a gating pulse biases the device 698 to an other-than-normal condition the junction 694 is then balanced and input energy applied thereto does not appear on its output arm 701. Thus, it is seen that the junction 694 and its associated circuitry are the microwave implementation of the INHIBIT unit 331 of FIG. 3A.

The output of the junction 694 is transmitted to a circulator element 663, is transferred in a counterclockwise direction to a waveguide stub 664, is reflected back to the circulator element 663 and again transferred in a counterclockwise direction to a waveguide section 665. The delay introduced by the circulator element 663 and the waveguide stub 664 is designed to be $N-1-\alpha$ digit intervals.

The output of the circulator element 663 passes through an amplifier 695 and is then split by a directional coupler 666, one part of the energy being transmitted to the junction 640 and another part to a rectifier 667. The rectifier 667, in turn, is the biasing source for the side arm device 632 of the junction 630.

The junction 630 functions as an EXCLUSIVE–OR circuit, providing an output if only one, but not both, of the devices 631 and 632 therein is biased to an other-than-normal condition by the energization of the devices 623 and 667, respectively.

The junction 640 functions as an AND circuit, providing an output on arm 645 if the device 641 is biased by the device 624 to an other-than-normal condition and if energy is coupled to the input 646 of the junction 640 by the directional coupler 666.

Similarly, in accordance with the principles and explanation given above, it may be seen that the junction 660 is an EXCLUSIVE-OR circuit and that junction 670, which is coupled to the junction 650, functions as an AND circuit.

The accumulator of FIG. 6 includes a second carry path or waveguide 671 in which is positioned a unit 672 which introduces a delay of $N-1-\alpha$ digit intervals. The accumulator further includes a first carry path 681 in which an amplifier 682 and an $\alpha+1$ digit delay unit 683 are located. Also, the accumulator comprises a junction 690, which functions as a four-terminal directional coupler, and a directional coupler 684 having three terminals.

It is noted that FIG. 6 includes an arrow parallel and adjacent to each of the main signal paths thereof. These arrows indicate the direction of microwave energy propagation in the novel accumulator of FIG. 6.

It is to be understood that the above-described arrangements are only illustrative of the application of the principles of the present invention. Numerous other arrangements may be devised by those skilled in the art without departing from the spirit and scope of the invention. For example, a microwave accumulator similar in form to that of FIG. 6 may be easily constructed in view of the disclosure above to implement the novel arrangement depicted in FIG. 5A.

Furthermore, it is to be noted that the novel concepts of this invention may be easily embodied in systems designed to add, subtract or divide, as well as to multiply.

What is claimed is:

1. In combination in an accumulator, means for supplying partial products which are spaced apart by N digit intervals, first means responsive to said partial products for generating intermediate sum and first carry signals, second means for generating second carry and sum signals, directional coupler means, first coupling means coupling said intermediate sum signals to said second generating means, second coupling means coupling said second carry signals to said directional coupler means, carry signal path means extending between said first generating means and said directional coupler for coupling said first carry signals to said directional coupler, means for propagating first and second carry signals interconnecting said directional coupler means and said second generating means, output path means interconnecting said first and second generating means, each of said first coupling, second coupling, propagating, and output path means including delay means, which delay means are so proportioned that carry signals generated by said second generating means are returned thereto in an accumulator cycle next following the one in which they are generated, and means connected to said output path means for periodically gating the final product digits out of said accumulator at an interdigit spacing of N digit intervals during the time in which partial products are being supplied to said accumulator.

2. In an accumulator capable of processing input digital information to obtain answer information therefrom, the digit intervals of said input information being sufficiently small that the inherent interstage delays of the accumulator make it impossible to retrieve carry signals within one digit interval of their generation, output gating circuitry including an INHIBIT circuit having an inhibiting input terminal, a normal input terminal, and an output terminal; an AND circuit having two input terminals and an output terminal; and a source of gating pulses connected to said inhibiting input terminal and to one of the input terminals of the AND circuit for supplying gating pulses thereto in respectively corresponding time positions, whereby the application of accumulated digital information to said normal input terminal and to the other of the input terminals of the AND circuit results in the appearance at the output terminal of the AND circuit of digits of the answer, the digits of the answer occurring in synchronism with the gating pulses, and in the appearance at the output terminal of the INHIBIT circuit of digital information which is subsequently reprocessed by the accumulator and represented to the output gating circuitry.

References Cited in the file of this patent

FOREIGN PATENTS 797,912     Great Britain _____ July 9, 1958

OTHER REFERENCES

Richards: Arithmetic Operations in Digital Computers, D. Van Nostrand Co., Inc., New York (March 1955), pp. 130–133 relied on.